United States Patent [19]
Daniello

[11] 3,896,622
[45] July 29, 1975

[54] MOBILE POWER GENERATION DEVICE EMPLOYING TROPICAL WATER THERMOCLINE

[76] Inventor: George T. Daniello, 15704 Pamela Dr., Silver Spring, Md. 20904

[22] Filed: July 22, 1974

[21] Appl. No.: 490,845

[52] U.S. Cl.................................... 60/641; 60/641
[51] Int. Cl. ........................... F03g 7/06; F03g 7/04
[58] Field of Search ................. 60/641, 531; 165/45

[56] References Cited
UNITED STATES PATENTS
| | | | |
|---|---|---|---|
| 1,493,368 | 5/1924 | Merz | 60/641 |
| 2,006,985 | 7/1935 | Claude et al. | 60/641 X |
| 2,578,992 | 12/1951 | Dickey | 60/531 |
| 3,312,054 | 4/1967 | Anderson et al. | 60/531 |

FOREIGN PATENTS OR APPLICATIONS
| | | | |
|---|---|---|---|
| 830,964 | 4/1938 | France | 60/641 |

*Primary Examiner*—Martin P. Schwadron
*Assistant Examiner*—Allen M. Ostrager

[57] ABSTRACT

A power generating device operating in tropical ocean waters, containing a working fluid which absorbs heat from the warm surface ocean water to boil and vaporize to raise a piston. The device is then caused to descend to colder water depths whereby the vapor condenses, allowing the piston to fall through its stroke to perform useful work.

13 Claims, 7 Drawing Figures

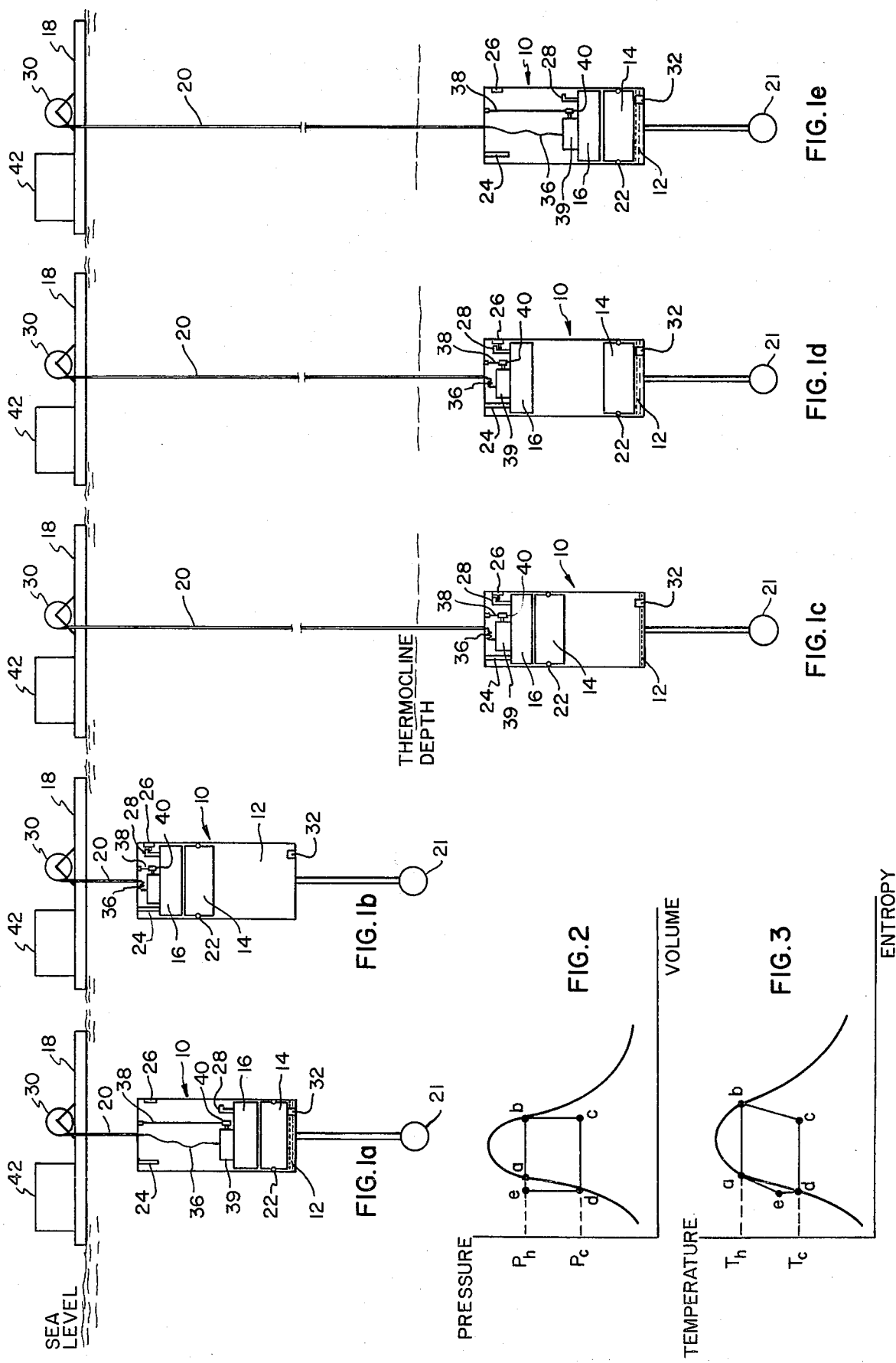

MOBILE POWER GENERATION DEVICE EMPLOYING TROPICAL WATER THERMOCLINE

BACKGROUND OF THE INVENTION

The present invention relates to an energy conversion device, and more particularly to an energy conversion device employing the thermocline of tropical oceans as the source of energy. The principal sources of energy employed today are hydroelectric, fossil fuel, and atomic reactor power plants. With the current energy crisis, limitations of these three energy sources have become apparent. Fossil fuel power plants, which face fuel shortages and high fuel costs, are also charged with pollution of the atmosphere. Atomic reactor power plants are charged with thermal pollution of rivers, as well as presenting radiation hazards and radioactive waste disposal problems. Hydroelectric power plants, while nonpolluting and relatively safe, cannot be further exploited for lack of suitable new sites which have both the high head and the high flow rates necessary for power generation.

Due to the aforementioned limitations of the conventional sources of energy, it is becoming necessary to tap new energy reserves. One such energy reserve is the natural temperature gradient (thermocline) which exists in tropical ocean waters. That is, the surface layer, comprising the upper 300 feet, is always warm (at least 77°F) and the deep water (depths exceeding 900 feet) is colder (about 36°F). Such a temperature difference spread over huge masses of ocean water represents a virtually unlimited supply of energy. Exploitation of this energy supply has the potential to produce useful power without consuming any fuel, as well as being nonpolluting and safe.

Much thought and effort has been given to the design of devices to employ the thermocline in an energy conversion system to have it perform useful work. To date, all these efforts have been directed towards stationary (Rankine cycle type) land based or surface based systems which absorb heat from the warm surface layer and reject heat to the cold deep layer by pumping the warm and/or cold waters to the system. Pumping the water from the depths requires power, and therefore reduces its efficiency and the net power output from the system.

Another loss inherent in the Rankine cycle system is the head loss due to pumping the working fluid through heat exchangers at the high flow rates necessary to produce appreciable amounts of power. Further, the Rankine cycle system has inherent losses within the turbine itself. No turbine is a perfect expander and the inefficiencies become more and more critical when working with a small temperature difference power generating machine.

All of these loss factors tend to feed on each other. A loss of power in the turbine must be made up by increasing the flow rate of the working fluid which forces an increase in the size of the heat exchangers and an increase in the rate of flow of heating and cooling water. These increases in turn mean more pumping losses which necessitate more power equipment which brings on more pumping losses, etc.. It becomes apparent that the efficiencies of the Rankine cycle system must be very closely controlled or else the power cycle will become an ever widening vicious circle of losses with little or no useful power output.

SUMMARY OF THE INVENTION

Accordingly, the present invention provides a unique and uncomplicated system for extracting energy from the ocean thermocline which is not subject to the large losses or the need for complex equipment of stationary systems as the closed Rankine cycle system. The invention is a mobile heat engine which can move vertically up and down in the water, comprising a housing, containing working fluid, a counterweight, and a piston which is situated above the counterweight. When the heat engine is in the warm water near the ocean surface, heat is absorbed at constant temperature and pressure to boil the working fluid and raise the piston and counterweight. The piston is then latched in place, and the engine is caused to sink to the cold depths where heat is rejected and the working fluid condenses back to a liquid. During the condensation phase of the cycle, the counterweight falls back down to the bottom of the housing but the latched piston remains in place at the top of the housing. After the condensation phase of the cycle is complete, the piston is unlatched and allowed to fall, performing useful work equalling its own weight multiplied by the distance (stroke) through which it falls. The engine is caused to rise to the ocean surface where it is in position to perform the aforementioned cycle anew.

OBJECTS OF THE INVENTION

It is therefore an object of the present invention to provide an extremely efficient system for extracting thermal energy from the ocean without power expended to pump water or working fluid.

Another object of the present invention is to provide an energy conversion system to provide useful power not emloying fuel and not posing a threat to the environment.

A further object of the present invention is to introduce a new and useful thermodynamic cycle for energy conversion.

Still another object of the present invention is to provide an energy conversion device not requiring complex equipment.

Yet another object of the present invention is to provide an efficient energy conversion system for extracting useful energy from the tropical water thermocline or geothermal heat or waste heat or sunlight or any other low temperature difference source.

A still further object of the present invention is to provide a mobile energy conversion device.

BRIEF DESCRIPTION OF THE DRAWINGS

These and other objects, attendant advantages, features and uses will become more apparent to those skilled in the art as a more detailed description proceeds when considered with the accompanying drawings in which:

FIGS. 1(a) – 1(e) are cross sections of the heat engine vehicle in each of five states of its cycle in accordance with the teachings of the present invention;

FIG. 2 is a pressure-volume curve illustrating the thermodynamic cycle through which the working fluid passes; and FIG. 3 is a temperature-entropy curve illustrating the thermodynamic cycle through which the working fluid passes.

DESCRIPTION OF THE PREFERRED EMBODIMENT

Referring now to FIGS. 1(a) – 1(e), the energy conversion system comprises a housing 10 containing working fluid 12, counterweight 14, piston 16, as well as ancillary equipment to be described hereinafter. Housing 10 may be attached to a moored barge 18 through a lifting cable 20 which may also serve to transfer electrical energy to the barge. A ballast 21 may be hung from the bottom of housing 10 to keep the housing upright.

The working fluid 12, which may be freon or any suitable equivalent, undergoes cyclic thermodynamic changes during the energy conversion cycle which is divided into several phases with various "states" marking the end of one phase and the beginning of another.

Referring now to FIGS. 1(a), 2 and 3, housing 10 is found in warm water near the ocean surface, where the working fluid 12 is a saturated liquid. At state (a), the working fluid 12 is at the high temperature of the cycle ($T_h$), which is only a few degrees cooler than the warm ocean surface water, and its equilibrium pressure at this temperature ($P_h$) just balances the combined weight of the piston 16 and counterweight 14, which rests upon the liquid working fluid. Heat from the surrounding warm water is transferred through housing 10 and absorbed by the working fluid 12 to boil and vaporize it at constant temperature and pressure whereby piston 16 and counterweight 14 are both raised to the top of the housing as shown in FIG. 1(b).

The pressure remains constant at $P_h$, because the combined weight of the piston 16 and counterweight 14 bears continuously on the vapor of the working fluid 12 and the temperature remains constant at $T_h$ because the working fluid is in a state of liquid-vapor equilibrium at constant pressure. A seal 22 is employed between the counterweight 14 and the housing 10 and the volume inside the housing above the seal is evacuated to prevent pressure buildup which would hamper the ascent of the piston and counterweight.

When piston 16 reaches the top of its stroke, cycle state (b) has been reached. The quantity of working fluid 12 in the housing 10 is selected so that when cycle state (b) is reached, the working fluid has almost totally been converted to vapor with very little liquid lying in the bottom of the housing.

The arrival of the piston 16 at the top of its stroke is sensed by a conventional sensor 24 which triggers electronically or otherwise, an electromagnetic (or other) latch 26 to engage a detent 28 fixed to the top of piston 16.

Upon receiving an indication from sensor 24, reel 30 begins to pay out lifting cable 20 to lower housing 10 to thermocline depth (i.e. the depth at which the deep cold layer of ocean water begins). Housing 10 is slightly negatively buoyant so that no energy is expanded in lowering the housing to thermocline depth.

Referring now to FIG. 1(c), at thermocline depth the temperature of the ocean water is a few degrees colder than the low temperature of the cycle ($T_c$). Heat is transferred from the working fluid 12 through the housing 10 wall and into the cold ocean water causing the vaporized working fluid to condense and flow down to the bottom of the housing. This phase continues until cycle state (c) is reached at which time the temperature of the partially condensed working fluid is equal to the cold temperature of the cycle and the corresponding pressure of the working fluid ($P_c$) just balances the weight of counterweight 14 alone.

Between cycle states (c) and (d), the piston 16 remains latched in position and heat continues to be transferred out of the working fluid 12 through housing 10. The counterweight 14 slowly falls toward the bottom of the housing 10 as the vapor condenses at constant temperature and pressure. The pressure remains constant because the weight of the counterweight 14 bears continuously on the vapor of the working fluid 12 and the temperature remains constant because the working fluid is in a state of liquid-vapor equilibrium at constant pressure.

Upon liquification of the working fluid 12, the counterweight 14 falls to the bottom of housing 10 to bring the cycle to state (d) (FIG. 1(d)), said occurrance detected by a conventional sensor 32 situated on the bottom of housing 10. Sensor 32 then triggers the release of the piston latch 26 (FIG. 1(e)). The piston 16 falls through its stroke doing an amount of useful work equal to its own weight multiplied by the distance through which it falls. This useful work is harnessed by generator 39 (fixed to the top of the piston) which changes the mechanical work into electrical energy to be transmitted to barge 18 via cables 36 and 20 where it may be stored, used or transmitted to shore by unit 42.

The mechanical energy is transferred to the generator 39 by means of a flexible cable 38. One end of cable 38 is fixed to the housing 10 while the rest of the cable is wound around a ratcheting (one way) pulley 40 which is fixed to the generator shaft. The electrical output of the generator 39 is transmitted to the power and lifting cable 20 through an extensible coiled cable 36. A linear motion electric generator could be employed, as well as a rotary type, as well as other means of converting the mechanical work of the piston 16 into any useful form of energy.

When piston 16 finishes falling through its stroke, it rests on top of the counterweight 14. This extra load increases the pressure on the working fluid 12 to $P_h$ and brings the cycle from state (d) to state (e) FIG. 1(e)). The extra load is sensed by sensor 32 and a signal is sent to reel 30 to raise housing 10 to the warm layer of water near the ocean surface (FIG. 1(a)). Raising housing 10 to the ocean surface takes only a very small fraction of the useful work produced by the piston 16 during each cycle.

Once at the ocean surface, heat is again transferred through housing 10 into the working fluid 12 raising the temperature of the working fluid to $T_h$ and bringing the cycle back to state (a). The energy conversion device is now ready to repeat cycle (a)–(e).

Thus, there has been described a novel and efficient system for employing the tropical thermocline to produce useful energy. Allowing the entire housing 10 to ascend and descend eliminates pumping losses inherent in stationary heat engine systems. In fact, there are no mechanical losses at all except for the seal 22 friction between the counterweight 14 and the housing 10 (negligible compared to the weight of the counterweight). Raising housing 10 is achieved by expending only a very small fraction of the net work output of the vehicle. Counterweight 14 may be omitted if desired with less efficiency obtained.

While the invention has been particularly shown and described with reference to a preferred embodiment thereof, it will be understood by those skilled in the art that various changes in form and details may be made therein without departing from the spirit and scope of the invention. While the invention has been described for operation in tropical waters, it is to be understood that the principles described hereinabove may be employed in other energy conversion systems operating on sunshine or geothermal heat or waste heat or anywhere a temperature gradient is situated.

What is claimed as new and desired to be secured by Letters Patent of the United States is:

1. A power generating device comprising:
   a medium of variable temperature;
   a closed housing in said medium;
   energy absorbing means within said housing for absorbing thermal energy from, and rejecting thermal energy to, said medium;
   energy conversion means within said housing for converting said thermal energy into useful work; and
   means exterior to said housing for relocating said housing within said medium;
   whereby said absorbing means absorbs thermal energy from said medium when said housing is in a warm location within said medium and said absorbing means rejects thermal energy to said medium when said housing is in a cool location within said medium and whereupon alternate absorption and rejection of thermal energy by said absorbing means causes said energy conversion means to perform useful work.

2. A power generating device as recited in claim 1 wherein said energy absorbing means comprises a fluid contained within said housing and wherein said energy conversion means comprises a piston within said housing above said fluid, whereby when said housing is in said warm location said fluid absorbes thermal energy from said medium and vaporizes to raise said piston, and whereby when said housing is in said cool location said fluid rejects thermal energy to said medium and condenses, enabling said piston to fall through its stroke and perform useful work.

3. A power generating device as recited in claim 2 wherein said medium is tropical water, said relocating means comprises means attached to said housing for ascending and descending said housing in said water from said warm location near the surface of said water to said cool location near thermocline depth of said water, whereby heat exchange with said tropical water exterior to said housing causes said fluid to vaporize at said warm location and condense at said cool location.

4. A power generating device as recited in claim 3 further including a counterweight within said housing situated above said fluid and below said piston.

5. A power generating device as recited in claim 4 further including latching means for retaining said piston near the top of said housing upon said fluid vaporizing to lift said counterweight and piston.

6. A power generating device as recited in claim 5 wherein said housing is lowered below the thermocline depth of the water after said piston is latched, whereby said vaporized liquid fluid condenses, enabling said counterweight to fall to the bottom of said housing.

7. A power generating device as recited in claim 6 further including first sensor means for detecting said counterweight at the bottom of said housing to cause said latching means to release said piston to fall onto said counterweight to perform useful mechanical work equal to said piston weight multiplied by the distance through which it falls.

8. A power generating device as recited in claim 7 further including generator means fixed to said piston for converting said useful mechanical work into electrical energy and transmitting said electrical energy to a remote location.

9. A power generating device as recited in claim 8 further including sealant means between said counterweight and walls of said housing, whereby the housing above said sealant may be evacuated.

10. A power generating device as recited in claim 9 wherein said fluid is freon, and wherein said fluid completely vaporizes when said housing is in said warm location.

11. A power generating device as recited in claim 10 further including second sensor means for detecting the presence of said piston near the top of said housing to cause said latching means to latch said piston.

12. A power generating device recited in claim 11 further including a ballast attached to the bottom of said housing, and wherein said remote location is a moored barge coupled to said housing.

13. A power generating device as recited in claim 12 further including a take up reel to raise said housing to said warm location upon indication from said first sensor means that said piston is near the bottom of said housing.

* * * * *